US011260588B2

(12) United States Patent
Stubenruss

(10) Patent No.: US 11,260,588 B2
(45) Date of Patent: Mar. 1, 2022

(54) 3D PRINTHEAD FOR USE IN A 3D PRINTER, 3D PRINTER WITH SUCH A 3D PRINTHEAD, METHOD FOR OPERATING SUCH A 3D PRINTER, AND PRODUCT PRODUCED BY A 3D PRINTER

(71) Applicant: Starfort KG des Stubenruss Moritz, Bressanone (IT)

(72) Inventor: Moritz Stubenruss, Bressanone (IT)

(73) Assignee: STARFORT KG DES STUBENRUSS MORITZ, Bressanone (IT)

(*) Notice: Subject to any disclaimer, the term of this patent is extended or adjusted under 35 U.S.C. 154(b) by 16 days.

(21) Appl. No.: 16/614,070

(22) PCT Filed: Apr. 25, 2018

(86) PCT No.: PCT/EP2018/060569
§ 371 (c)(1),
(2) Date: Nov. 15, 2019

(87) PCT Pub. No.: WO2018/210537
PCT Pub. Date: Nov. 22, 2018

(65) Prior Publication Data
US 2020/0171744 A1    Jun. 4, 2020

(30) Foreign Application Priority Data

May 16, 2017 (IT) .................. 102017000052877

(51) Int. Cl.
*B33Y 30/00*     (2015.01)
*B29C 64/209*    (2017.01)
(Continued)

(52) U.S. Cl.
CPC ............ *B29C 64/209* (2017.08); *B22F 10/10* (2021.01); *B29C 64/106* (2017.08);
(Continued)

(58) Field of Classification Search
None
See application file for complete search history.

(56) References Cited

U.S. PATENT DOCUMENTS

| 5,312,224 A | 5/1994 | Batchelder et al. |
| 5,656,230 A | 8/1997 | Khoshevis |
| (Continued) | | |

FOREIGN PATENT DOCUMENTS

| CN | 104916378 A | 9/2015 |
| WO | 97/19798 A2 | 6/1997 |
| WO | 2016020150 A1 | 2/2016 |

*Primary Examiner* — Armand Melendez
(74) *Attorney, Agent, or Firm* — Tarolli, Sundheim, Covell & Tummino LLP

(57) ABSTRACT

A 3D printer head comprises a chamber that is configured for receiving liquid or solid print material through an inlet. The chamber has an outlet opening on one surface, and a spiral feed screw is associated with the chamber and is configured for supplying the outlet opening with print material that passes from the inlet into the chamber, by coupling the spiral feed screw or the chamber to a drive that is configured for rotating the spiral feed screw or the chamber in such a way that the spiral feed screw rotates at a distance from the surface of the chamber and relative thereto. The spiral feed screw has at least one conveyor that is configured for conveying print material between a radially outwardly situated inlet area and a radially inwardly situated outlet area, toward the latter, and at least one discharge conveyor that is arranged and configured for conveying print material, together with gas present therein, away from at least one section of a radially outer border zone of the outlet area.

10 Claims, 2 Drawing Sheets

(51) Int. Cl.
  *B33Y 10/00* (2015.01)
  *B29C 64/141* (2017.01)
  *B29C 64/106* (2017.01)
  *B22F 10/10* (2021.01)

(52) U.S. Cl.
  CPC ............ *B29C 64/141* (2017.08); *B33Y 10/00* (2014.12); *B33Y 30/00* (2014.12)

(56) References Cited

U.S. PATENT DOCUMENTS

| | | |
|---|---|---|
| 2002/0113331 A1 | 8/2002 | Zhang et al. |
| 2012/0023763 A1 | 2/2012 | Ariyanayagam et al. |
| 2012/0237631 A1 | 9/2012 | Jenko |
| 2017/0210069 A1* | 7/2017 | Stubenruss ............ B29C 64/118 |

* cited by examiner

3D PRINTHEAD FOR USE IN A 3D PRINTER, 3D PRINTER WITH SUCH A 3D PRINTHEAD, METHOD FOR OPERATING SUCH A 3D PRINTER, AND PRODUCT PRODUCED BY A 3D PRINTER

BACKGROUND

A 3D printer, a 3D printer head for use in such a 3D printer, a method for operating such a 3D printer, and a printed product produced with such a 3D printer are disclosed herein. This 3D printer is configured for processing granular, powdered, or liquid plastic or components of two- or multi-part plastic systems (thermoplastics, epoxides, acrylates, polylactides, acrylic ester-styrene-acrylonitrile, polymethyl methacrylate, polyethylene (PE), polyvinyl chloride (PVC), polyethylene terephthalate (PET) or glycol-modified polyethylene terephthalate (PETG), polyethylene naphthalate (PEN), acylonitrile-butadiene-styrene (ABS) copolymer, polyvinyl butyral (PVB), polymethyl methacrylate (PMMA), polyamide (PA), polyimide (PI), polyvinyl alcohol (PVA), polystyrene (PS), polyvinylphenol (PVP), polypropylene (PP), polycarbonate (PC), or the derivatives thereof, etc.), as well as low-melting metals or metal alloys as print material. It is also possible to output liquid plastics that react to light or heat, using the printer head disclosed herein, and to immediately cure them with a source of light or heat associated with the printer head. In the 3D printer disclosed herein, aggregates such as particles or fibers made of textile material, glass, carbon, metal, or the like may be added to the print medium in order to influence the material properties (density [g/cm$^3$], modulus of elasticity [MPa], elongation at break [%], tensile strength [MPa], melting point [° C.], etc.). Details in this regard are defined in the claims; however, the description and the drawings contain relevant information concerning the structure and mode of functioning, and concerning variants of the method and the device components.

PRIOR ART

US 2012/0237631 A1 relates to a screw feed system of a 3D printer that is fed with granules. Due to the difficulty of controlling the heat transfer from the printer head to the supplied granules, the granules may adhere in the supply channel of the printer head or in the feed screw, as the result of which the print material passes into the printer head nonuniformly, and also exits same nonuniformly. This impairs the structure of the printed product, since the applied layers may have irregular layer thicknesses or undesirable discontinuities.

Further technological background is disclosed by U.S. Pat. No. 5,656,230 A (Khoshevis) and US 2002/113331 A1 (Zhang).

WO 2016/020150 A1 (Stubenruss) relates to a granule/liquid flow adjusting device for 3D printer heads supplied with granules and/or liquids. This system delivers high-quality printed products made of different materials and aggregates, with very high precision and uniform layer thickness and with a high material discharge (volume of print material per unit time). For this purpose, the 3D printer head disclosed therein has a chamber with a (base) surface in which an outlet opening is provided. A spiral feed screw which supplies the print material to the outlet opening is situated in the chamber. A force generator pushes the spiral feed screw in the direction of the surface, the distance between the spiral feed screw and the surface being adjustable via the pressure from the print material being fed.

The relative rotary speed between the surface and the spiral feed screw is adjustable as a function of the pressure from the print material. This system conducts granules or liquids through a supply channel and into the chamber via a plate having an outlet opening. Molten or liquid print material that is obtained from the granulate or the liquids may exit through the outlet opening. The print material is guided in the direction of the chamber outlet opening, or the print material is brought back in a direction facing away from the outlet opening, by rotating the spiral feed screw relative to the plate; in the event of excessive pressure from the print material, the spiral feed screw rises up against the acting axial force, reducing the effectiveness of the spiral feed screw.

During the processing of print material in the form of granules or powder, or also when liquid plastics are used, gas in the form of protective gas supplied to the print material, chemical reaction gases (in multicomponent plastic systems, for example), air, evaporated moisture, etc., may be present in the material. This gas may adversely affect the uniformity of the applied print material, and thus, the quality of the printed product.

WO97/19798 A2 (Stratasys) relates to a device for producing a three-dimensional physical object by sequentially depositing a plurality of layers of a solidifiable material on a carrier element in accordance with a pattern. This device comprises a nozzle for providing an extruded material, a pump having an inlet and an outlet, the outlet being in fluid connection with the nozzle and providing a pressurized stream of solidifiable material in a liquid state to the nozzle. A drive connected to the pump enables the pump to provide a variable pressure level and flow rate of the solidifiable material to the nozzle. A pressurization stage has an outlet connected to the inlet of the pump to provide the solidifiable material to the inlet in a liquid state and under a certain intermediate pressure. This intermediate pressure should ensure for all functional pressure levels and flow rates of the pump that a continuous quantity of solidifiable material is available at the inlet for continuous operation of the pump. This ensures an uninterrupted flow of solidifiable material to and through the nozzle. The solidifiable material is supplied to the pressurization stage as a solid. The pressurization stage has a conduit for receiving the solid and heating it to transfer the solid to the liquid state of the solidifiable material. A drive brings the solid into the conduit to pressurize the liquid state of the solidifiable material to the specified intermediate pressure.

With this arrangement, the pressurization takes place in at least two stages in order to also control the gas development. In WO97/19798 A2 it was recognized that many extrusion materials release gases during their transport through an extruder. Thermoplastic polymers, which are somewhat hygroscopic, release water vapor when heated to their melting temperature. Other gases released may be softeners, monomers and oxidation products. Gas in the pressure part of the extruder reduces the pressure agility of the extruder. For this reason, the volume of extrusion material that is brought to full pressure is kept as small as possible in the arrangement of WO97/19798 A2.

In WO97/19798 A2, the pressurization process carried out by the extruder is divided into two or more stages. In the first stage of the extruder, the gas developed by the extruder is separated in an arrangement of WO97/19798 A2 at the relatively low pressure at the outlet of the first stage. In one variant, gas developed from the liquid extrusion material in a pre-heater is separated from the extrusion material in a connecting channel and escapes from the extruder via a rotary sealing at the inlet to the second pressurization stage.

A conical viscosity pump (see also U.S. Pat. No. 5,312,224) is provided as the second pressurization stage in accordance with WO97/19798 A2. Here liquid extrusion material is supplied from the connecting channel to a rotating displacer which is rotated by a variable speed motor in a sleeve to drive the liquid extrusion material towards and out of a nozzle and an opening. The first stage is designed to prevent underfeeding or cavitation of the pump at its inlet when used with high viscosity extrusion materials. Other second stages include gear pumps, oscillating piston pumps, sliding vane rotary pumps, single and twin screw pumps, etc.

According to WO97/19798 A2, typical extrusion material deposition rates should be between 0.1 and 10 in$^3$ (1.64 cm$^3$ to 164 cm$^3$) per hour.

OBJECT OF THE INVENTION

The object is for a 3D printer head to be able to process even print material of varying quality, fluctuating moisture content, gas content, or the like to form printed products having consistently high quality.

ACHIEVEMENT OF THE OBJECT

To this end, the 3D printer head is equipped with a feed screw having the function and design as disclosed herein and defined in patent Claim 1.

EMBODIMENTS AND VARIANTS

In particular, the 3D printer head has a chamber that is configured for receiving liquid or solid print material through an inlet, wherein the chamber has an outlet opening on one surface, and a spiral feed screw is associated with the chamber and is configured for supplying the outlet opening with print material that passes from the inlet into the chamber, by coupling the spiral feed screw to a drive that is configured for rotating the spiral feed screw in a conveying direction of the spiral feed screw at a distance from the surface and relative thereto, wherein the spiral feed screw has at least one conveyor that is configured for conveying print material between a radially outwardly situated inlet area and a radially inwardly situated outlet area, toward the latter, and at least one discharge conveyor that is configured for conveying print material, together with gas present therein, away from at least one section of a radially inner border zone of the conveyor.

The 3D printer head proposed herein is based on the finding that material fed into the chamber of the 3D printer head may contain gas, or that gas may form due to heating or chemical reactions. Before it exits from the outlet opening of the chamber, this gas may pass into the feed screw and collect there, confined by walls of the feed screw. These gas inclusions may combine in the print material, present in the feed screw, to form one or more fairly large gas bubbles. The volumetric flow of the print material out of the feed screw through the chamber outlet opening is relatively low during the 3D printing operation. If such a gas bubble present in the print material, together with the print material, passes into the area in front of the chamber outlet opening, this gas bubble impairs the supplying of print material to the chamber outlet opening. The printing operation is disturbed, since less than the usual amount of, or even no, print material is discharged through the outlet opening while the gas bubble is present in the area of the chamber outlet opening. In other words, as a result of its configuration, the feed screw loses preferably little of its conveying capability due to the discharged gas inclusions. This is based on the finding that at locations where a gas bubble is present, the feed screw is able to generate little or no thrust in the direction of the chamber outlet opening. This would impair the material flow of the print material from the chamber outlet opening and could, in extreme cases, come to a complete standstill. The gas inclusions would thus result in such a large pressure drop that the feed screw would experience little or no lift from the chamber surface having the outlet opening. In the worst case, little or no material exits from the chamber outlet opening. The controller of the 3D printer head is not able to detect or respond to this disturbance. As a result, the printed product may thus have a flaw and be unusable.

With the configuration of the 3D printer head disclosed herein, it is possible to rotate the spiral feed screw and the chamber relative to one another in such a way that the gas inclusions present in the print material are transported away through the discharge conveyor, at least from the radially inner border zone of the conveyor, before such gas inclusions reach the interior of the outlet area, and the spiral feed screw thus conveys print material that is largely free of gas into the interior of the outlet area, and from there to the chamber outlet opening. Interruptions in the material flow from the chamber outlet opening are thus effectively reduced or prevented.

In one variant of the configuration of the 3D printer head disclosed herein, the spiral feed screw has an approximately circular end-face side that faces the surface of the chamber having the outlet opening. Alternatively or additionally, the end-face side has a center that is in approximate alignment with the outlet opening in the surface of the chamber. Alternatively or additionally, the end-face side of the spiral feed screw is situated approximately parallel to the surface of the chamber (with a tilt angle of up to 30°), and is oriented in such a way that the radially inwardly situated outlet area of the spiral feed screw rotates at a distance from the outlet opening, and close thereto.

In one variant of the configuration of the 3D printer head disclosed herein, the spiral feed screw has a radially outwardly situated inlet area into the conveyor that is formed by a lateral cutout having an approximately circular sector shape in a top view on the end-face side. Alternatively or additionally, on the side of the inlet area remote from the inlet of the conveyor, the spiral feed screw has a wall on the end which delimits the conveyor and/or the discharge conveyor, the outer end of the wall leading ahead of its inner end, in a top view on the end-face side, in the rotational direction of the spiral feed screw (relative to the chamber). Alternatively or additionally, this wall guides print material led in the conveyor toward the outlet area situated in the center of the spiral feed screw. Alternatively or additionally, this wall extends until it protrudes inwardly beyond the discharge conveyor. Alternatively or additionally, this wall also guides the print material transversely with respect to the discharge conveyor, beneath same and/or into same.

In one variant of the configuration of the 3D printer head disclosed herein, the spiral feed screw has an outlet area [having] an annular wall that is oriented at least approximately coaxially with respect to the center longitudinal axis of the spiral feed screw and surrounds the outlet area. The annular wall has an opening at a location where the wall extends from the conveyor to the outlet area. Alternatively or additionally, the opening is configured for allowing print material to pass from the conveyor, past the discharge conveyor, through the opening to the outlet area situated in the center of the spiral feed screw.

In one variant of the configuration of the 3D printer head disclosed herein, the spiral feed screw has a collar on its circumference which is oriented at least approximately coaxially with respect to the rotational axis and which radially outwardly delimits the conveyor. Alternatively or additionally, the collar has a free, lower edge that delimits the end-face side of the spiral feed screw toward the surface of the chamber having the outlet opening. Alternatively or additionally, the conveyor has a top surface that extends, at least partially, around the center longitudinal axis of the spiral feed screw. Alternatively or additionally, the top surface of the conveyor delimits same on its side remote from the surface of the chamber. Alternatively or additionally, the conveyor is at least partially open toward the surface of the chamber. Alternatively or additionally, the top surface of the conveyor is oriented at an angle of 90° plus/minus up to 25° with respect to the rotational axis of the spiral feed screw.

In one variant of the configuration of the 3D printer head disclosed herein, the spiral feed screw has a discharge conveyor whose top surface is situated at a greater distance from the end-face side of the spiral feed screw than is the top surface of the conveyor. This facilitates discharge of print material together with trapped gas away from the outlet area. Alternatively or additionally, at least one section of the discharge conveyor is situated farther radially inward than is a section of the conveyor. Alternatively or additionally, the discharge conveyor on the one hand and the outlet area on the other hand are dimensioned and configured in such a way that the discharge conveyor provides a first flow resistance to the print material, and the outlet area provides a second flow resistance to the print material, the first flow resistance being less than the second flow resistance. The magnitude of the second flow resistance of the outlet area is small enough that print material flows into the outlet area toward the outlet opening during a relative rotation of the spiral feed screw with respect to the chamber.

In one variant of the configuration of the 3D printer head disclosed herein, the spiral feed screw has at least one section of the conveyor that surrounds the discharge conveyor, at least partially, in the circumferential direction of the spiral feed screw. Alternatively or additionally, the discharge conveyor surrounds the outlet area situated in the center of the spiral feed screw. Alternatively or additionally, the discharge conveyor extends to the inlet of the conveyor or beyond same in order to transport print material and trapped gas away from the discharge conveyor. Alternatively or additionally, the discharge conveyor has at least one opening in its top surface, along its extension, that is configured for allowing print material and trapped gas to escape from the discharge conveyor.

Alternatively or additionally, at least one section of the discharge conveyor is situated further radially inward than is a section of the conveyor. It is thus possible for at least the section of the conveyor to convey more print material than the section of the discharge conveyor. Print material thus flows from the section of the conveyor in the direction of the outlet area.

Alternatively or additionally, at least one section of the conveyor at least partially surrounds the discharge conveyor in the circumferential direction of the spiral feed screw. In one variant, the discharge conveyor surrounds the outlet area situated in the center of the spiral feed screw. In addition, the discharge conveyor may extend to the inlet of the conveyor in order to transport print material and trapped gas away from the discharge conveyor. The discharge conveyor may have at least one opening in its top surface, along its extension, through which print material and trapped gas may escape from the discharge conveyor.

As a further approach to achieving the object mentioned above, a 3D printer is proposed, comprising a 3D printer head having one or more of the preceding features, which is to be moved relative to a holder for a printed product along at least one geometric axis, a controller being associated with the 3D printer and being configured for moving the 3D printer head relative to the holder by means of at least one axle drive. Alternatively or additionally, a drive for the spiral feed screw relative to the chamber is provided in order to deliver print material from the outlet opening to the holder in a controlled manner.

As a further approach to achieving the object mentioned above, a method for operating a 3D printer having a 3D printer head is proposed, having the following steps:
providing a chamber that has an outlet opening on one surface,
associating a spiral feed screw with the chamber,
providing the spiral feed screw with at least one conveyor and at least one discharge conveyor,
loading a chamber with liquid or solid print material,
causing a relative rotation of the spiral feed screw with respect to the chamber about a center longitudinal axis of the spiral feed screw, an end-face side of the spiral feed screw being situated at a distance from the surface of the chamber,
conveying print material between a radially outwardly situated inlet area and a radially inwardly situated outlet area by means of the conveyor, and
conveying print material, together with gas present therein, away from at least one section of a radially outer border zone of the outlet area.

This procedure reduces the risk of or prevents a gas bubble, present in the print material, together with the print material passing into the area in front of the chamber outlet opening and disturbing the printing operation. In the event of such a disturbance, less than the usual amount of, or even no, print material would be discharged through the outlet opening. As a result of its configuration, the feed screw loses preferably little of its conveying capability due to the effective discharge of gas inclusions.

Alternatively or additionally, the relative rotation of the spiral feed screw with respect to the chamber is brought about in such a way that it transports away gas inclusions present in the print material, at least from the radially outer border zone of the outlet area, into the discharge conveyor before such gas inclusions reach the interior of the outlet area. The spiral feed screw thus conveys print material that is largely free of gas into the interior of the outlet area, and from there to the chamber outlet opening.

As a further approach to achieving the object mentioned above, a 3D printed product is proposed that is obtainable by means of a 3D printer with a 3D printer head, having one or more of the preceding device aspects and/or by means of a method having one or more of the preceding method aspects.

Such a printed product or component produced by means of a 3D printer having a 3D printer head with one or more preceding device aspects and/or by means of a method with one or more of the preceding method aspects is clearly distinguishable from a conventionally produced printed product or component. Due to the reduction/prevention of gas discharge from the chamber outlet opening, the printed product obtained here has considerably less or no (relevant) gas inclusions than a printed product produced in a conventional manner.

In a conventionally produced printed product or component, for example, a gas inclusion between individual layers of the print material can be clearly recognized in a section through the component. Gaps in the course of a layer of the print material can also be dearly recognized in a conventionally produced printed product or component. A gas discharge from the chamber outlet opening is also immediately recognizable by the printed product obtained. Such a gas discharge from the chamber outlet opening into the printed product leads either to an intrusion/depression on the surface of the printed product, or the gas discharge leads inside the printed product as a material defect to an open or closed gas pocket. Ultimately, this gas discharge leads to a considerable reduction in the strength of the finished printed product.

This reduction in strength can also be demonstrated, for example, by a non-destructive material test, such as an ultrasonic test. The subsequent elimination of such proven defects in a finished printed product is only possible with considerable effort.

It is noted that, although numerical ranges and numerical values are disclosed herein, all numerical values between the disclosed values and any numerical subrange within the stated ranges are likewise regarded as disclosed. It is further noted that, although a number is stated for a relationship between the various dimensions of the components described herein, any particular components of the type described herein do not necessarily have to fulfill each and every relationship between the various dimensions stated herein.

BRIEF DESCRIPTION OF THE DRAWINGS

Further objectives, features, advantages, and application possibilities result from the following description of several exemplary embodiments and associated drawings. All features described and/or graphically depicted, alone or in any combination, constitute the subject matter disclosed herein, regardless of their grouping in the claims or their back-references.

DETAILED DESCRIPTION OF THE DRAWINGS

Figure 1:
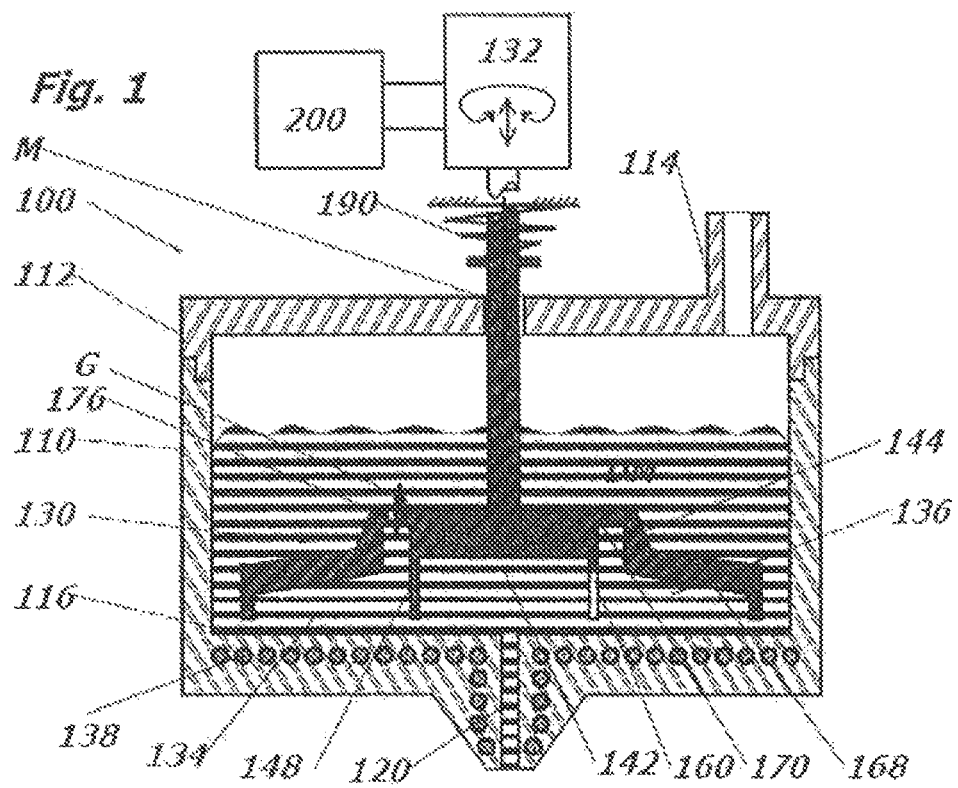
FIG. 1 illustrates a schematic lateral sectional view of a 3D printer head that embodies the approach proposed herein.

A 3D printer head 100 illustrated in FIG. 1 has a cup-shaped chamber 110 that is to be closed by a cover 112. The cover 112 has an inlet 114 for allowing liquid or solid print material DM to be supplied to the chamber 110. Granular, powdered, or liquid plastic or components of two- or multi-part plastic systems, as well as well as low-melting metals or metal alloys, may be used as print material DM for the printer head 100. In the illustrated variant, the cup-shaped chamber 110 and the cover 112 are made of steel. However, other materials are also usable. On one surface 116 (in FIG. 1, its base surface), the chamber 110 has an outlet opening 120, designed as a nozzle, for the print material DM. A spiral feed screw 130 is situated inside the chamber 110. This spiral feed screw 130 is used for supplying the outlet opening 120 with print material DM that passes through the inlet 114 into the chamber 110. For this purpose, in the illustrated variant the spiral feed screw 130 is coupled to a drive 132. The drive 132 is configured for rotating, by means of a controller 200, the spiral feed screw 130 relative to the chamber 110 in such a way that the spiral feed screw 130, more precisely, its lower end-face side 134 in FIG. 1, rotates at a distance from the surface 116 of the chamber 110. This distance is only a few 100 μm up to several (approximately 2 to 5) mm, depending on the type of print material DM, its viscosity, and its possible aggregates (particles or fibers made of textile material, glass, carbon, metal, or the like). In order to melt the print material DM and influence its viscosity, provided that it is introduced into the chamber 110 as a granulate or powder, a heating coil 138 situated in the base of the chamber 110 is used, whose heating power is likewise regulated by the controller 200. For this purpose, the temperature of the print material DM in the chamber is detected and signaled to the controller 200 in a manner not explained in greater detail.

The spiral feed screw 130 has at least one conveyor 136 for conveying liquid/liquefied print material DM between a radially outwardly situated inlet area 140 and a radially inwardly situated outlet area 142 toward the latter when the drive 132 rotates the spiral feed screw 130 relative to the chamber 110 about the center longitudinal axis M of the spiral feed screw 130. In addition, the spiral feed screw 130 has a discharge conveyor 144 that transports print material DM together with gas G present therein away from a radially inner border zone 146 of the conveyor 136 when the drive 132 rotates the spiral feed screw 130 relative to the chamber 110 about the center longitudinal axis M of the spiral feed screw 130.

Gas inclusions G present in the print material DM are thus transported away, at least from the radially inner border zone 146 of the conveyor 136, through the discharge conveyor 144 before such gas inclusions G reach the interior of the outlet area 142. The spiral feed screw 130 thus conveys print material DM that is largely free of gas into the interior of the outlet area 142, and from there to the chamber outlet opening 120.

As illustrated, the spiral feed screw 130 has an approximately circular end-face side 134 that faces the surface 116 of the chamber 110 having the outlet opening 120. The end-face side 134 has a center Z that is in approximate alignment with the outlet opening 120 in the surface 116 of the chamber 110. The end-face side 134 of the spiral feed screw 130 is situated approximately parallel to the surface 116 of the chamber 110. The radially inwardly situated outlet area 142 of the spiral feed screw 130 rotates at a distance from the outlet opening 120 of the chamber 110, the center Z of the end-face side 134 and the outlet opening 120 of the chamber 110 being in alignment with one another.

Figure 2:
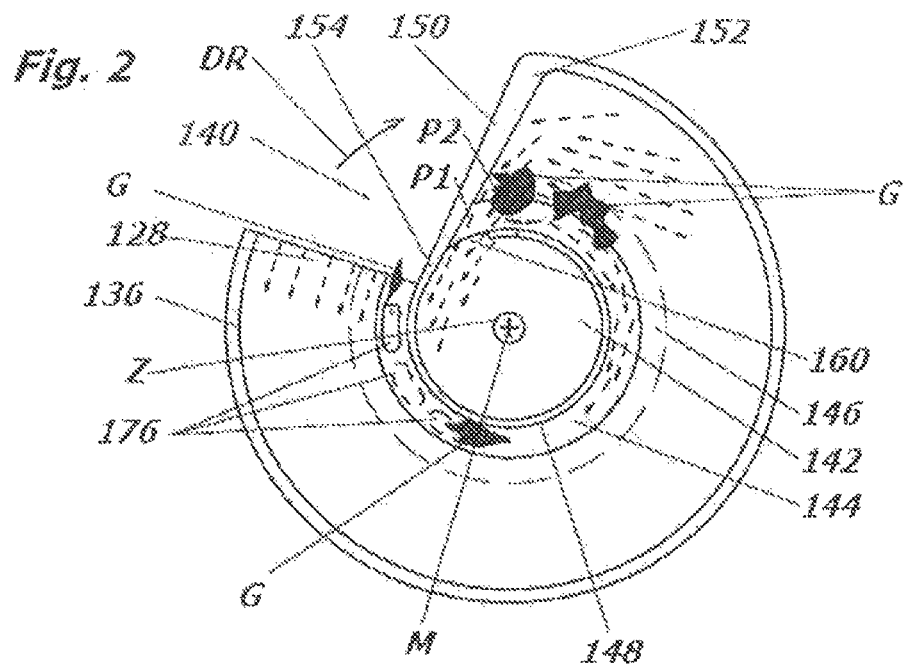
FIG. 2 illustrates a schematic top view of an end-face side of a spiral feed screw in the direction of the arrows A in FIG. 1.

The conveyor 136 is situated upstream from the inlet area 140 in the conveyor 136. This inlet area 140 is formed by a lateral cutout having an approximately circular sector shape in a top view on the end-face side (see FIG. 2). On the side of the inlet area 140 remote from the inlet 128 of the conveyor 136, the spiral feed screw 130 has a wall 150 on the end, which delimits the conveyor 136 and the discharge conveyor 144. The outer end 152 of the wall 150 leads ahead of the inner end 154 of the wall 150, in a top view on the end-face side, in the rotational direction DR of the spiral feed screw 130. This wall 150 guides print material DM led in the conveyor 136, on a path having the shape of a spiral section, toward the outlet area 142 situated in the center Z of the spiral feed screw 130. This wall 150 extends until it protrudes inwardly beyond the discharge conveyor 144, toward the center Z. The wall 150 also guides the print material DM transversely with respect to the discharge conveyor 144, beneath same and/or into same, as depicted by the arrows P1 and P2.

The radially inwardly situated outlet area 142 of the spiral feed screw 130 is delimited by an annular wall 148 that is oriented at least approximately coaxially with respect to the center longitudinal axis M of the spiral feed screw 130 and surrounds the outlet area. The annular wall 148 has an opening 160 at a location where the wall 150 extends from the conveyor 136 to the outlet area 142. Print material DM is thus able to pass from the conveyor 136, past the discharge conveyor 144, through the opening 160 to the outlet area 142 situated in the center of the spiral feed screw 130 when the spiral feed screw 130 rotates relative to the chamber 110 in the rotational direction DR.

On its end-face side 134 facing the outlet opening 120, the spiral feed screw 130 along its circumference has a collar 164 which is oriented at least approximately coaxially with respect to the center longitudinal axis M and which radially outwardly delimits the conveyor 136. As illustrated in FIG. 1, the collar 164, the annular wall 148, and the wall 150 on the end-face side 134 of the spiral feed screw 130 extend approximately equally in the direction of the surface 116 of the chamber 110. For this purpose, the collar 164 has a free, lower edge 166 that delimits the end-face side 134 of the spiral feed screw 130 toward the surface 116 of the chamber 110 having the outlet opening 120.

In addition, the conveyor 136 has a top surface 168 that extends, at least partially, around the center longitudinal axis M. This top surface 168 of the conveyor 136 delimits the conveyor 136 on its side remote from the surface 116 of the chamber 110. The conveyor 136 on its side facing the surface 116 of the chamber 110 is open toward the surface 116 of the chamber 110. The top surface 168 of the conveyor 136 is oriented at an angle of approximately 1200 with respect to the center longitudinal axis M of the spiral feed screw 130, rising toward the center in the shape of a conical section. In another variant, the top surface 168 of the conveyor 136 is oriented at an angle of approximately 90° with respect to the center longitudinal axis M of the spiral feed screw 130. The top surface 168 may also have a shape that progressively rises toward the center longitudinal axis M of the spiral feed screw 130.

The discharge conveyor 144 has a top surface 170 that is situated at a greater distance from the end-face side 134 of the spiral feed screw 130 than is the top surface 168 of the conveyor 136. In addition, the discharge conveyor 144 in the spiral feed screw 130 is situated farther radially inward than is the conveyor 136. The discharge conveyor 144 on the one hand and the outlet area 142 on the other hand are dimensioned and configured in such a way that the discharge conveyor 144 provides a lower flow resistance to the print material DM than does the outlet area 142. The flow resistance of the outlet area 142 is also determined by the dimensions of the opening 160, and its magnitude is small enough that sufficient print material DM flows into the outlet area 142 toward the outlet opening 120 during a relative rotation of the spiral feed screw 130 with respect to the chamber 110. If the pressure in the print material DM between the spiral feed screw 130 and the surface 116 of the chamber 110 becomes too great, and therefore too much print material DM would be ejected via the outlet opening 120, the spiral feed screw 130 lifts away from the surface 116 of the chamber 110, against the load of a spring 190.

The conveyor 136 has the shape of a circular ring section, and surrounds the discharge conveyor 144, which likewise has the shape of a circular ring section, in the circumferential direction of the spiral feed screw 130. The discharge conveyor 144 surrounds the approximately circular center of the spiral feed screw 130 with the outlet area 142 present at that location. In the variant shown, the discharge conveyor 144 extends from the opening 160 to the inlet 128 of the conveyor 136, where it opens into the inlet area in order to transport print material DM and trapped gas G away from the radially inner border zone 146 of the conveyor 136 through the discharge conveyor 144. The print material DM and gas G trapped therein flow in the opposite direction from the flow direction of the print material DM in the conveyor 136. In the variant likewise illustrated, the discharge conveyor 144 along its extension has multiple openings 176 in its top surface 170, through which print material DM and gas G trapped therein can escape from the discharge conveyor 144. This effectively prevents print material DM with gas G trapped therein from being able to pass into the outlet area 142 and to the outlet opening 120.

For the 3D printer head 100, during print operation only a small quantity of print material DM exits from the outlet opening 120. Gas G in form of air, inert gas introduced into the 3D print head 100, water vapor escaping from the print material DM, softeners, monomers and oxidation products also passes into the conveyor 136 of the spiral feed screw 130 along with the print material DM. A larger quantity of print material DM is received into the conveyor 136 of the spiral feed screw 130 than exits from the outlet opening 120. The configuration of the discharge conveyor 144 proposed here on the one hand allows at least a portion of the excess quantity of print material DM to be discharged before it passes into the outlet area 142. When the spiral feed screw 130 lifts off from the surface 116 of the chamber 110 in a controlled manner, another portion of the excess quantity of print material DM may escape radially outwardly from the conveyor 136. On the other hand, due to the configuration of the discharge conveyor 144 proposed here, in cooperation with other components of the spiral feed screw 130 in the chamber 110, gas G trapped in the print material DM is also effectively hindered from passing into the outlet area 142. Instead, the print material DM conducted into the discharge conveyor 144 is discharged from the spiral feed screw 130. Since the top surface of the discharge conveyor 144 is situated at a greater distance from the surface 116 than is the top surface of the conveyor 136, gas G trapped in the print material DM may ascend into the discharge conveyor 144 on its inward path from the conveyor 136 into the outlet area 142. At that location, the trapped gas G is transported by the counterflow to the openings 170 in the top surface of the discharge conveyor 144, or to the end of the discharge conveyor in the inlet area of the conveyor 136. Thus, the trapped gas G is not able to adversely affect a controlled exit of print material DM through the outlet opening 120. Rather, as a result of its configuration, the spiral feed screw 130 loses preferably little of its conveying capability due to the effective discharge of gas inclusions, and in particular that these gas inclusions G in the print material DM do not get to the outlet opening 120 and thus contaminate the printed product DE.

Figure 3:
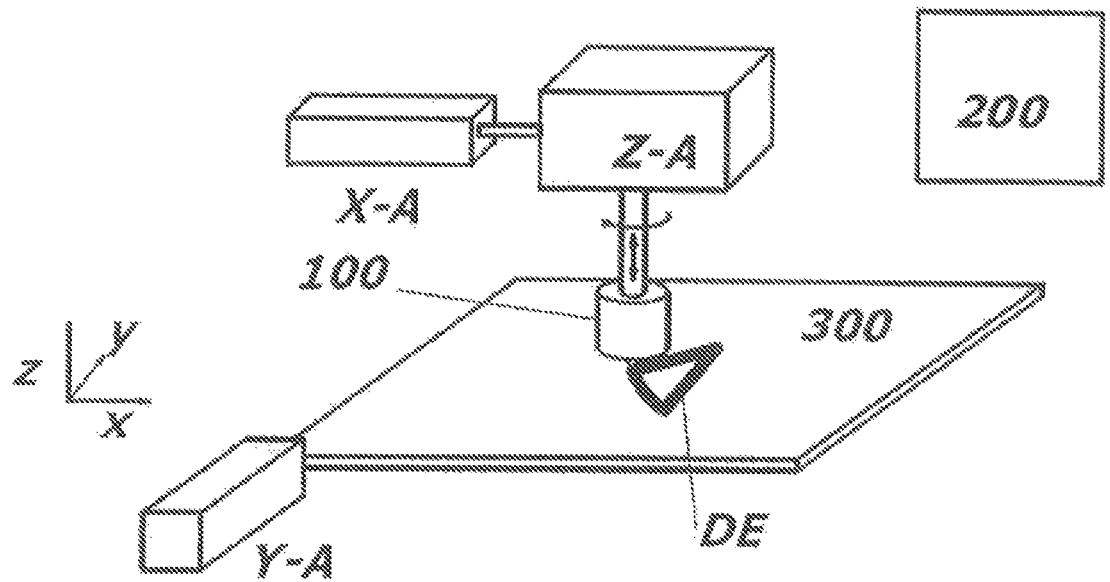
FIG. 3 illustrates a schematic view of a 3D printer, having a 3D printer head, that embodies the approach proposed herein.

A 3D printer having a 3D printer head 100 proposed here moves the 3D printer head, as illustrated in FIG. 3, relative to a flat holder 300 for a printed product DE along at least one geometric axis x, y, z. For this purpose, the 3D printer has a controller 200, which by means of respective axle drives X-A, Y-A, Z-A moves the 3D printer head 100 and the holder 300 relative to one another, and also actuates the drive 132 for the spiral feed screw 130 in the chamber 100 in order to deliver print material from the outlet opening 120 to the holder 300 in a controlled manner. A 3D printed product is thus obtainable by means of the 3D printer having the 3D printer head, and using the procedure explained here.

Figure 4:
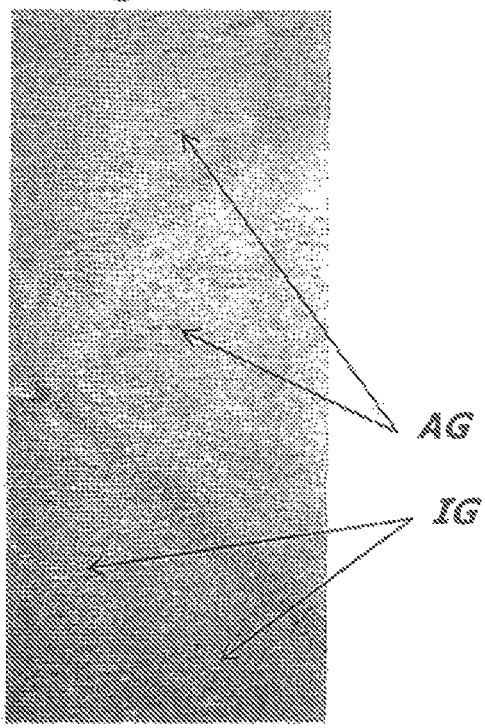
FIG. 4 illustrates a photograph of a portion from a printed product that is produced with a conventional print method.
Figure 5:
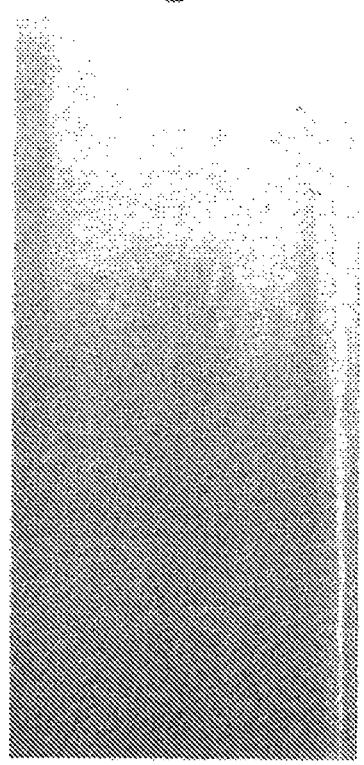
FIG. 5 illustrates a photograph of a portion from a printed product that is produced with the 3D printer head presented here according to the print method presented here.

Such a printed product or component produced by means of a 3D printer having a 3D printer head with one or more preceding device aspects and/or by means of a method with one or more of the preceding method aspects is dearly distinguishable from a conventionally produced printed product or component as is dearly recognizable in FIGS. 4 and 5. Both samples show a layered structure of polycarbonate, with a large number of external gas inclusions AG and internal gas inclusions IG present in the conventionally produced printed product (FIG. 4). This is practically not the case for the printed product (FIG. 5) which has been produced by means of a 3D printer having a 3D printer head with one or more previous device aspects and/or by means of a method with one or more previous method aspects. The reduction/prevention of gas discharge from the chamber outlet opening has the consequence that the printed product obtained here (FIG. 5) has considerably less or practically no (relevant) gas inclusions.

The above-described variants of the method and of the device are used solely for better understanding of the structure, the mode of functioning, and the properties of the proposed approach, and do not limit the disclosure to the exemplary embodiments, for example. The figures are schematic, wherein important properties and effects are sometimes illustrated with significant enlargement in order to clarify the functions, operating principles, technical configurations, and features. Any mode of functioning, any principle, any technical configuration, and any feature disclosed in the figures or in the text may be freely and arbitrarily combined with any of the claims, any feature in the text and in the other figures, or other modes of functioning, principles, technical configurations, and features contained in this disclosure or resulting therefrom, so that all conceivable combinations of the described approach are imputed. In addition, combinations of any individual statement in the text, i.e., in any section of the description or in the claims, and also combinations of various variants in the text, in the claims, and in the figures are encompassed. Although the details of devices and methods explained above are described in conjunction with one another, it is pointed out that they are also independent from one another and also freely combinable with one another. The relationships of the individual parts and sections thereof, shown in the figures, with one another as well as their dimensions and proportions are not to be construed as limiting. Rather, individual dimensions and proportions may also deviate from those shown. In addition, the claims do not limit the disclosure, or thus, possibilities for combining any stated features with one another. All stated features are also explicitly disclosed herein, individually and in combination with any other features.

LIST OF REFERENCE NUMERALS 3D printer head 100
cup-shaped chamber 110
cover 112
Inlet 114
liquid or solid print material DM
surface 116
outlet opening 120
inlet 128
spiral feed screw 130
drive 132
end-face side 134
conveyor 136
heating coil 138
inlet area 140
outlet area 142
discharge conveyor 144
radially inner border zone 146
wall 150
outer end 152 of the wall 150
inner end 154 of the wall 150
annular wall 148
opening 160
collar 164
free edge 166
top surface 168 of the conveyor 136
top surface 170 of the discharge conveyor 144
spring 190
controller 200
axle drives X-A, Y-A, Z-A
holder 300
print material DM
gas inclusions G
center longitudinal axis M of the spiral feed screw 130
rotational direction DR of the spiral feed screw 130
center Z of the spiral feed screw 130
arrows P1 and P2
printed product DE
external gas inclusion AG
internal gas inclusion IG

The invention claimed is:

1. A 3D printer head, comprising
a chamber that is configured for receiving liquid or solid print material through an inlet, wherein
the chamber has an outlet opening on one surface, and
a spiral feed screw is associated with the chamber and is configured for supplying the outlet opening with print material that passes from the inlet into the chamber, by coupling the spiral feed screw or the chamber to a drive that is configured for rotating the spiral feed screw or the chamber in such a way that the spiral feed screw rotates at a distance from the surface of the chamber and relative thereto, wherein
the spiral feed screw has an approximately circular end-face side that faces the surface of the chamber having the outlet opening, has at least one conveyor that is configured for conveying print material between a radially outwardly situated inlet area and a radially inwardly situated outlet area, toward the latter, and has at least one discharge conveyor that is arranged and configured for conveying print material, together with gas present therein, away from at least one section of a radially inner border zone of the conveyor, wherein the discharge conveyor has a top surface that is situated at a greater distance from the end-face side of the spiral feed screw than is the top surface of the conveyor,
wherein at least one section of the discharge conveyor is situated farther radially inward than is a section of the conveyor, wherein the discharge conveyor on the one hand and the outlet area on the other hand are dimensioned and configured in such a way that the discharge conveyor provides a first flow resistance to the print material, and the outlet area provides a second flow resistance to the print material, the first flow resistance being less than the second flow resistance, and the magnitude of the second flow resistance of the outlet area being small enough that print material flows into the outlet area toward the outlet opening during a relative rotation of the spiral feed screw with respect to the chamber, and wherein the discharge conveyor has at least one opening in its top surface, along its extension, that is configured for allowing gas to escape from the discharge conveyor through the spiral feed screw in a direction opposite the one surface with the outlet opening.

2. The 3D printer head according to claim 1, wherein the spiral feed screw and the chamber are configured for rotating relative to one another in such a way that the gas inclusions present in the print material are transported away through the discharge conveyor, at least from the radially inner border zone of the conveyor, before such gas inclusions reach the interior of the outlet area, and the spiral feed screw thus conveys print material that is largely free of gas into the interior of the outlet area, and from there to the chamber outlet opening.

3. The 3D printer head according to claim 1, wherein
the end-face side has a center that is in approximate alignment with the outlet opening in the surface of the chamber, and/or
the end-face side of the spiral feed screw is situated approximately parallel to the surface of the chamber, and is oriented in such a way that the radially inwardly situated outlet area of the spiral feed screw rotates at a distance from the outlet opening, and close thereto.

4. The 3D printer head according to claim 1, wherein
a radially outwardly situated inlet area into the conveyor is formed by a lateral cutout having an approximately circular sector shape in a top view on the end-face side, and/or
on the side of the inlet area remote from the inlet of the conveyor, the spiral feed screw has a wall on the end which delimits the conveyor and/or the discharge conveyor, the outer end of the wall leading ahead of its inner end, in a top view on the end-face side, in the rotational direction of the spiral feed screw, and/or
this wall guides print material led in the conveyor toward the outlet area situated in the center of the spiral feed screw, and/or
this wall extends until it protrudes inwardly beyond the discharge conveyor, and/or
this wall also guides the print material transversely with respect to the discharge conveyor, beneath same and/or into same.

5. The 3D printer head according to claim 1, wherein
the outlet area has an annular wall that is oriented at least approximately coaxially with respect to the center longitudinal axis of the spiral feed screw and surrounds the outlet area, wherein
the annular wall has an opening at a location where the wall extends from the conveyor to the outlet area, and/or
the opening is configured for allowing print material to pass from the conveyor, past the discharge conveyor, through the opening to the outlet area situated in the center of the spiral feed screw.

6. The 3D printer head according to claim 1, wherein
the end-face side of the spiral feed screw facing the outlet opening has a collar on its circumference which is oriented at least approximately coaxially with respect to the center longitudinal axis and which radially outwardly delimits the conveyor, and/or
the collar has a free, lower edge that delimits the end-face side of the spiral feed screw toward the surface of the chamber having the outlet opening, and/or
the conveyor has a top surface that extends, at least partially, around the center longitudinal axis, and/or
the top surface of the conveyor delimits same on its side remote from the surface of the chamber, and/or
the conveyor is at least partially open toward the surface of the chamber, and/or
the top surface of the conveyor is oriented at an angle of 90° plus/minus up to 25° with respect to the center longitudinal axis of the spiral feed screw.

7. The 3D printer head according to claim 1, wherein
at least one section of the conveyor surrounds the discharge conveyor, at least partially, in the circumferential direction of the spiral feed screw, and/or
the discharge conveyor surrounds the outlet area situated in the center of the spiral feed screw, and/or
the discharge conveyor extends to the inlet of the conveyor or beyond same in order to transport print material and trapped gas away from the discharge conveyor.

8. A 3D printer, comprising a 3D printer head according to claim 1, which is to be moved relative to a holder for a printed product along at least one geometric axis, a controller being associated with the 3D printer and being configured for moving the 3D printer head relative to the holder by means of at least one axle drive, and/or a drive for the spiral feed screw relative to the chamber in order to deliver print material from the outlet opening to the holder in a controlled manner.

9. A method for operating a 3D printer having a 3D printer head according to claim 1, comprising the following steps:
providing a chamber that has an outlet opening on one surface,
associating a spiral feed screw with the chamber,
providing the spiral feed screw with at least one conveyor and at least one discharge conveyor,
loading a chamber with liquid or solid print material,
causing a relative rotation of the spiral feed screw with respect to the chamber about a center longitudinal axis of the spiral feed screw, an end-face side of the spiral feed screw being situated at a distance from the surface,
conveying print material between a radially outwardly situated inlet area and a radially inwardly situated outlet area by means of the conveyor, and
conveying print material, together with gas present therein, away from at least one section of a radially outer border zone of the outlet area.

10. The method according to claim 9, wherein the relative rotation of the spiral feed screw with respect to the chamber is brought about in such a way that it transports away gas inclusions present in the print material, at least from the radially outer border zone of the outlet area, into the discharge conveyor before such gas inclusions reach the interior of the outlet area, and the spiral feed screw thus conveys print material that is largely free of gas into the interior of the outlet area, and from there to the chamber outlet opening.

* * * * *